A. DAVIS.
BELT MEASURING DEVICE.
APPLICATION FILED APR. 9, 1915.
1,225,223.                                    Patented May 8, 1917.
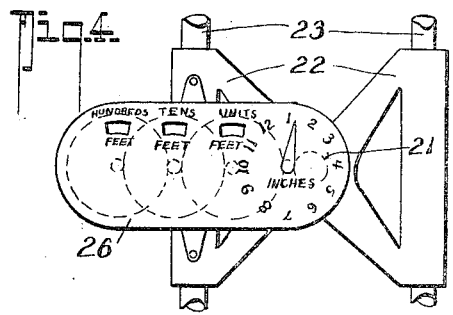
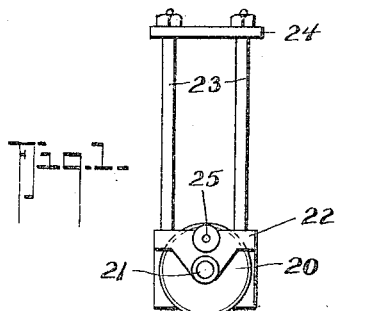
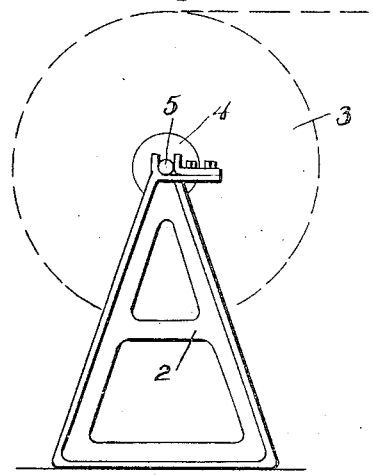
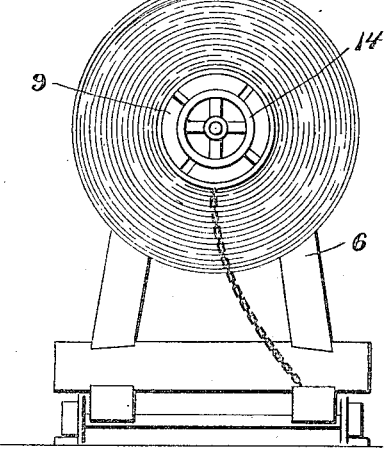
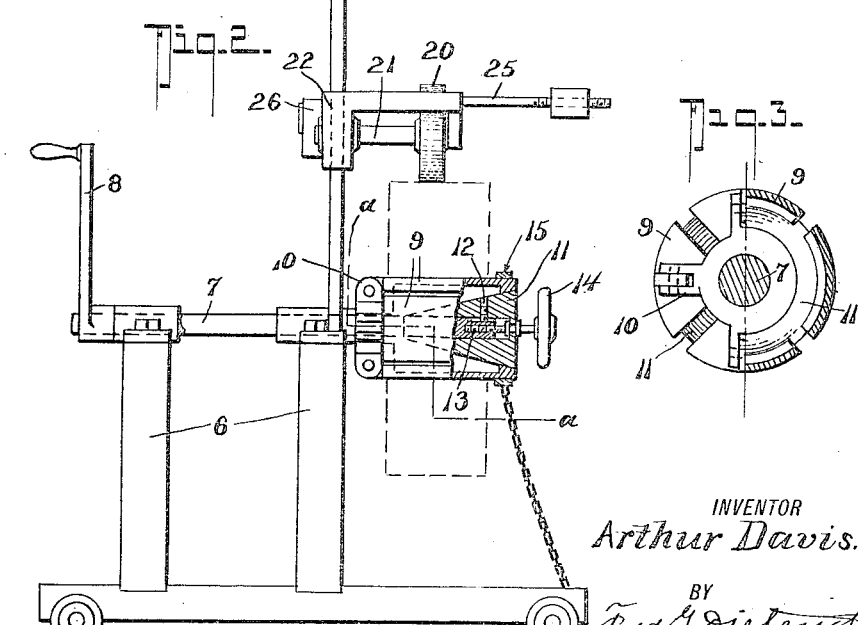
INVENTOR
Arthur Davis.
BY
ATTORNEYS.

UNITED STATES PATENT OFFICE.

ARTHUR DAVIS, OF NEW WESTMINSTER, BRITISH COLUMBIA, CANADA.

BELT-MEASURING DEVICE.

1,225,223.  Specification of Letters Patent.  Patented May 8, 1917.

Application filed April 9, 1915. Serial No. 20,227.

*To all whom it may concern:*

Be it known that I, ARTHUR DAVIS, a citizen of the Dominion of Canada, residing at New Westminster, in the Province of British Columbia, Canada, have invented certain new and useful Improvements in Belt-Measuring Devices, of which the following is a specification.

This invention relates to a device for withdrawing a length of belting off its stock roll and for coiling the same and for measuring the amount so coiled, the object of the invention being to facilitate the work of a salesman handling belting.

As this service is usually performed, the belting is unrolled on the floor of a warehouse and is measured as so extended and when the required amount is cut off it has to be recoiled for delivery. The stock rolls of belting being of considerable weight and the belting, when uncoiled, tending to resume the curvature of its coil, the salesman generally requires an assistant to enable him to perform this work satisfactorily.

By the device, which is the subject of this application, a salesman is enabled to coil without assistance a length of belting direct from the stock roll ready for delivery, and in the operation of coiling the amount as coiled is measured and indicated.

In the device, which is the subject of this application, each stock coil of belting is rotatably mounted on a short length of shaft supported in a suitable stand or rack and the measuring device is mounted on wheels to run on track rails across the front of this stand or rack, so that it may be conveniently moved opposite to the roll of belting from which it is desired to measure the length purchased, and the track rails insure that the axis of the measuring device may be parallel to the axis of the stock roll.

The coiling and measuring device comprises a short length of shaft rotatably mounted in the stand, one end of which shaft is squared to receive a crank handle and the other end has a contractible arbor having provision for connection of the end of the belting to it. This arbor overhangs the supporting frame that the belt when coiled and measured may be readily removed from the arbor.

Immediately over the middle of the arbor a measuring wheel is secured on a short shaft rotatably mounted within an open frame slidable on columns secured to and projecting upward from the frame so that the wheel may retain frictional contact with the belting as it is coiled on the arbor and may move freely upward as the diameter of the coil increases.

The circumference of the measuring wheel is such as will give a unit of linear measurement and its axle is connected by a train of gears to count and indicate the revolutions of the measuring wheel, thus indicating the length of belting coiled on the arbor.

The invention is particularly described in the following specification, reference being made to the drawings by which it is accompanied, in which:

Figure 1 is an end elevation showing the measuring device in relation to the stock coil of belting.

Fig. 2 is a side elevation and part section of the measuring device.

Fig. 3 is a cross section of the contractible arbor to an enlarged scale, and

Fig. 4, an enlarged view of the counter indicator.

In these drawings 2 represents the stand on which the stock coil of belting 3 is rotatably mounted, preferably by means of a core piece 4 inserted in the core of the coil, which core piece is provided with self-lubricating bearings to run on a short length of shaft 5 carried in the stand 2. The supporting frame 6 of the measuring machine has a truck frame which is mounted on flanged wheels to run on track rails across the front of the several stands in which the stock coils of belting are carried.

Rotatably mounted in bearings in the supporting frame 6 is a length of shaft 7 which is squared at one end for a crank handle 8, and has secured on its opposite end a contractible arbor on which the belting to be measured is coiled.

This contractible arbor is preferably constructed, as shown in the drawings, and comprises three or more cylinder segments 9, each hinge-connected at 10 to a ring which is keyed on the shaft 7 and at the other end rests on a conical support 11 which is concentric with the shaft and is connected to rotate with it by the end of a screw 12, which end is endwise movable in a keyway in the shaft 7.

The cone 11 is endwise moved on the shaft to expand or contract the arbor segments by a screw 13 threaded axially into the end of the shaft and rotatable in the end of the cone with provision to prevent endwise movement therein. This screw has a hand wheel 14 secured on its end by which it may be operated.

A light metal ring 15 is attached by a length of chain to the truck frame of the device to limit the outward movement of the segments 9 at the diameter required and is removable when the arbor is contracted to remove the coil.

The end of the belting from the stock coil 3 being connected in any convenient manner to the arbor, such as by inserting it under one of the segments 9 when the arbor is rotated by means of the crank handle 8, the belting will be drawn from the stock coil 3 and coiled upon the arbor of the measuring device.

The length of the amount so coiled is measured by a wheel 20 which is secured on a shaft 21 rotatable in a light open frame 22 which is slidably mounted to move vertically on columns 23 secured to and projecting upward from the frame 6, and braced together at the upper end by a yoke 24. The frame 22 is designed to carry the wheel 20 over approximately the middle of the contractible arbor.

This measuring wheel 20 rotates by frictional contact with the belt and the frame 22 in which it is mounted is free to lift on the columns 23 as the diameter of the coil of belting on the arbor increases.

To give the required frictional grip of the wheel on the belt and to check any tendency which the carrying frame 22 might have to clutch on the columns 23, a rod 25 is secured to and projects from the front end of the frame on which rod a counterweight is adjustably secured.

The shaft 21 on which the measuring wheel is secured, is connected to a counter 26 and indicating mechanism of any suitable character which is preferably secured on that side of the frame 22 which is toward the crank handle 8 so that the operator will have the dimension as wound on the coil immediately before him while winding. One dial of this counter will indicate inches, the next the unit number of feet, the next tens and the next hundreds.

In order to have a reasonable diameter of measuring wheel it is preferred that the circumference of that wheel be, say two feet and the revolutions of the measuring wheel shaft be communicated to the counter mechanism to give its first motion pointer one revolution for each foot of belt which passes under the measuring wheel and thereafter by ten to one gearing that will give units, tens and hundreds of feet measurement.

Two possible sources of error must be guarded against in the application of the measuring wheel to the belt; one that the wheel be not applied where the belting is flexed or is bent around the arbor, and the other that the element of slip between the measuring wheel and the belt be eliminated or rendered constant.

As illustrated in the drawing the measuring wheel is applied where the belting is straight before it bends around the coil and to insure this it may be found necessary to pass the belt to the arbor of the measuring wheel between guide rollers mounted on the carriage, which will rise and fall with the measuring wheel as the diameter of the coil increases.

The slip may be reduced by providing a roughened surface of any suitable character to the periphery of the measuring wheel and by imposing a sufficient weight on the wheel to hold it tightly in contact with the belt.

In the application of the device the stock rolls of belting may be rotatably mounted on parallel axes on stands or in racks in tiers one above the other, and when a length of belt is required the measuring machine is run opposite to the stock roll of the belt ordered, and the end of the belt is attached to the contractible arbor of the machine, the segments of the arbor having first been expanded to the limit of the ring 15 placed on it. The arbor is then rotated by the crank handle 8 and the belt is coiled on the arbor and the amount so coiled is continuously measured and indicated on the counter as it passes under the measuring wheel 20.

When the counter indicates that the required amount is coiled the belt is tacked to the coil and is cut at the required length.

The convenience of being able to expeditiously perform this operation will readily commend itself to those who have ever conducted a sale of belting under the present practice.

In practice it may not be found necessary to provide a contractible arbor in which event a cylindrical hollow arbor will be provided having a slot open to the outer end in which the end of the belting may be passed.

Having now particularly described my invention, I hereby declare that what I claim as new and desire to be protected in by Letters Patent, is:

1. A belting measuring device, comprising a shaft rotatably mounted in a suitable frame, said shaft having an arbor secured on one end to which arbor the end of the belt to be measured is connected; and a measuring wheel rotatably mounted on an axis parallel to that of the arbor in a frame which is vertically slidable over the arbor and a support for said frame on which said frame has vertical sliding movement for the purpose of changing the distance between the arbor and the measuring wheel according to the depth of the material wound on the arbor.

2. A belting measuring device, comprising a shaft rotatably mounted in a suitable frame, said shaft having a contractible arbor secured on one end to which arbor the end of the belting to be measured is connected, a measuring wheel rotatably mounted on an axis parallel to that of the arbor in a frame which is vertically slidable over the arbor, and means for indicating the linear measurement corresponding to the revolutions of the measuring wheel and a support for said frame on which said frame has vertical sliding movement for the purpose of changing the distance between the arbor and the measuring wheel according to the depth of the material wound on the arbor.

3. A belting measuring device, comprising in combination a frame mounted to run on wheels, a shaft rotatably mounted in said frame the axis of which is normal to those of the carrying wheels of the frame, an arbor secured on the end of the shaft to project beyond the same to which arbor the end of the belting to be measured is connected, means for rotating the shaft, parallel columns upwardly projecting from the frame, a measuring wheel secured on a spindle which is rotatably mounted in a frame slidably mounted on the columns to project the measuring wheel over the arbor, means for balancing the weight of the slidable frame on the contact of the measuring wheel on the belt as coiled on the arbor, and means for indicating the linear measurement corresponding to the revolutions of the measuring wheel.

4. A belt measuring device comprising a support, a crank shaft journaled in said support, an arbor mounted on said shaft, said arbor adapted to receive the end of the belting to be measured and on which arbor the belting is designed to be wound, a pair of vertical guides projecting above said arbor, a vertically slidable frame on said guides, a measuring register carried by said frame and including an operating shaft and a measuring wheel mounted on said operating shaft, and weight means for holding said measuring wheel in contact with the belt on said arbor, substantially as shown and for the purposes described.

In testimony whereof I affix my signature in presence of two witnesses.

ARTHUR DAVIS.

Witnesses:
ROWLAND BRITTAIN,
MAY WHYTE.

Copies of this patent may be obtained for five cents each, by addressing the "Commissioner of Patents, Washington, D. C."